(12) United States Patent
Berrill

(10) Patent No.: US 7,542,039 B2
(45) Date of Patent: Jun. 2, 2009

(54) METHOD AND APPARATUS OF CHOOSING RANGES FROM A SCALE OF VALUES IN A USER INTERFACE

(75) Inventor: Arthur R. Berrill, Ontario (CA)

(73) Assignee: Pitney Bowes Software Inc., Troy, NY (US)

( * ) Notice: Subject to any disclaimer, the term of this patent is extended or adjusted under 35 U.S.C. 154(b) by 157 days.

(21) Appl. No.: 11/506,871

(22) Filed: Aug. 21, 2006

(65) Prior Publication Data

US 2008/0049039 A1 Feb. 28, 2008

(51) Int. Cl.
*G06T 11/20* (2006.01)
*G06F 3/048* (2006.01)

(52) U.S. Cl. ........................ 345/440; 715/833
(58) Field of Classification Search ............... 345/440; 715/833
See application file for complete search history.

(56) References Cited

U.S. PATENT DOCUMENTS

| | | | | |
|---|---|---|---|---|
| 5,546,529 A | * | 8/1996 | Bowers et al. | 715/848 |
| 5,877,758 A | * | 3/1999 | Seybold | 715/866 |
| 6,067,477 A | * | 5/2000 | Wewalaarachchi et al. | 700/83 |
| 6,956,572 B2 | * | 10/2005 | Zaleski | 345/440.2 |
| 7,180,516 B2 | * | 2/2007 | Kapler et al. | 345/418 |
| 2002/0052967 A1 | * | 5/2002 | Goldhor et al. | 709/231 |
| 2002/0126121 A1 | * | 9/2002 | Robbins | 345/440 |
| 2005/0078111 A1 | * | 4/2005 | Cardno et al. | 345/440 |
| 2006/0028470 A1 | * | 2/2006 | Bennett et al. | 345/440 |
| 2006/0202994 A1 | * | 9/2006 | Chevallier et al. | 345/440 |

OTHER PUBLICATIONS

"Interactive Visualization of Spatiotemporal Patterns Using Spirals on a Geographical Map" (Hewagamage, et al. Visual Languages, 1999. Proceedings. 1999 IEEE Symposium on Sep. 13-16, 1999 pp. 296-303.*
"Interactive Visualization of Spatiotemporal Patterns using Spirals on a Geographical Map" Hewagamage, et al., Visual Language 1999, Proceedings: 1999 IEEE Symposium on Sep. 13-16, 1999, pp. 296-303.

* cited by examiner

*Primary Examiner*—Kee M Tung
*Assistant Examiner*—Michelle K Lay
(74) *Attorney, Agent, or Firm*—Michael J. Cummings; Steven J. Shapiro; Angelo N. Chaclas

(57) ABSTRACT

The invention relates to a method and apparatus for choosing ranges from a scale of values in a user interface without the loss of detail or context while minimizing the real estate used on the user interface. The invention, more particularly, relates to a method and apparatus for selecting, viewing and/or analyzing one or more range selections from an extended domain of values on a displayable shape.

9 Claims, 11 Drawing Sheets

METHOD AND APPARATUS OF CHOOSING RANGES FROM A SCALE OF VALUES IN A USER INTERFACE

FIELD OF THE INVENTION

The invention relates generally to software user interfaces and more particularly to a user interface for choosing and displaying ranges from a scale of values in a user interface to enhance detail while minimizing the display area used on the user interface.

BACKGROUND OF THE INVENTION

Modern software user interfaces have display features designed to offer a user the opportunity to choose one or more values from a continuous range. An example of a type of interface tool is known as a slider. As shown in FIG. 1, a slider 100 looks like an old style radio tuning face with a bar showing the full range of possible values and an indicator showing the value currently chosen. Specifically, FIG. 1 illustrates a cluster of sliders 100a-100d controlling multiple variables used to render an object.

Sliders can also be used to indicate a value range within a context. For example, FIG. 2 illustrates a range slider 200, as used in Microsoft Word®, that shows the active region of a document within its overall context, i.e., the width of the page. The context of the slider (i.e., the available domain for the user's use or choice) can often be scaled onto the user's display. It may, however, be the case that the granularity of the selection to be made from the available range is too fine or too small to be visualized in the user interface.

For example, if a software company is examining sales figures over the life of a product, the user could examine the data using a slider 300 such as illustrated in FIG. 3. In this example, the slider reflects sales figures ranging from 1995, (the year the product was introduced) to the present. The user has the capability to then choose any period or range, e.g., between Jan. 1, 2001 and Apr. 1, 2001, to more closely examine and analyze. The slider 300 begins to exhibit a severe weakness in this context. As shown in FIG. 3, the selected range is barely discernable because the selected range is too narrow or small compared to the overall range, which is extensive. The above-noted deficiency is exacerbated when several ranges are selected.

FIG. 4 illustrates an example of a user selecting more than one range 402 comparing the sales figures from Jan. 1, 1995 to Apr. 1, 1995 with the sales figures 404 from Jan. 1, 2005 to Apr. 1, 2005. The visualization of the duration 406 between the two ranges is as important to the user as the selected ranges. For example, measuring the duration may be critical to evaluate total sales of a product from its introduction to the present. As described and demonstrated by FIGS. 3 and 4, a traditional slider is limited in the discernable detail it can display. Thus, the clarity to illustrate relationships between selected short ranges would be difficult because of the difficulty to capture small ranges of values in such a broad range of overall values.

To cure this problem, it is possible to display the selected ranges on separate sliders. However, this proposed solution does not allow for the display of the duration 406 between the selected ranges because the at least two selected ranges would be on separate sliders. Therefore, a user cannot change the visible window on a particular slider so that he/she can access other values or the full extent of the domain (e.g., the sales over the complete period, 1995 to 2006) by simply moving the selected range along the slider. Thus, separation onto distinct sliders is inconvenient and does not facilitate the full display of a domain. Moreover, a user also faces the challenge of a selected range potentially exceeding the visible portion of the domain. For example, if a one hundred year segment is chosen then the display may be too small to show small segments (e.g., 3-5 years). In all of these variants of linear sliders, the context of the selection and thus the visual value of the slider is severely diminished or lost.

Therefore, there is a need for a user interface that allows for the display of information, including but not limited to ranges of values, without the loss of detail, context or accessibility due to lack of area on the user interface.

BRIEF SUMMARY OF THE INVENTION

The invention overcomes the above-noted deficiencies, by providing a method by which a user can choose and display information, including ranges from a scale of values, without loss of detail or context while minimizing the area used on the user interface. To accomplish this, the invention transposes data and values of information onto a displayable shape. The invention uses the displayable shape to display massive amounts of data and information in an easily viewable and manageable format in the context of a larger display without obscuring or cluttering the user interface.

It is an object of the invention to provide a computer-implemented method of selecting and displaying data comprising the steps of selecting from an extended domain of values a selected range; and transposing the selected range onto a displayable shape.

It is a further object of the invention to provide a system for selecting and displaying data comprising a means for selecting from an extended domain of values a selected range and a means for transposing the selected range onto a displayable shape.

It is a further object of the invention to provide a system for displaying information comprising a means for displaying a displayable shape and a means for displaying information on a face of the displayable shape.

It is a further object of the invention to provide a method of displaying information comprising the steps of displaying a displayable shape, displaying information on a side of the displayable shape and selecting a portion of the displayable shape to display the selected portion of the displayable shape.

It is a further object of the invention to provide a computer system for displaying information comprising a display and a processor connected to the display, where the processor is programmed to perform the steps of displaying a displayable shape, displaying information on a side of the displayable shape and selecting a portion of the displayable shape to display the selected portion of the displayable shape.

It is a further object of the invention to provide a method for choosing and displaying data comprising the steps of forwarding user selected ranges to a query engine, assembling a request for geometries and thematic subdivisions using a variable representing the user selected ranges, converting the altered user selected ranges into selection parameters, dispatching the outputted selection parameters to a data store, returning the stored data to the display engine and rendering the resulting displayable shape to the user.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The invention provides an advantageous method and apparatus for allowing and displaying one or more selected value ranges from an extended domain of values without the loss of details and/or any context while minimizing the space used on the user interface by transposing one or more value ranges, or an extended domain of values, onto a displayable shape for view and analysis. While the instant figures illustrate a sales example, the present invention may be used to display any type of information such as text, data, graphics, video, etc. The invention is a displayable shape in which any type of material can be displayed. The invention has the ability to display massive amounts of data and information in an easily viewable, condensed and manageable format in the context of a larger display such that it does not obscure or clutter the user interface.

Figure 1:
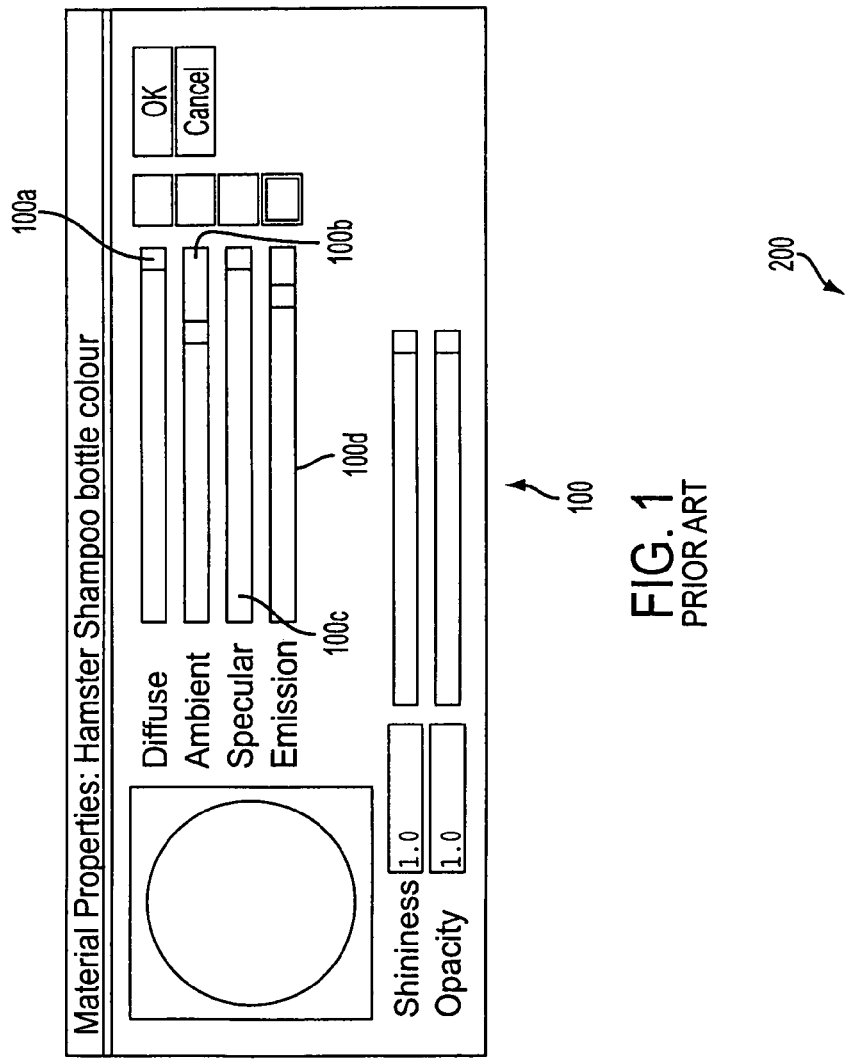
FIG. 1 is an illustration of a conventional slider.
Figure 2:
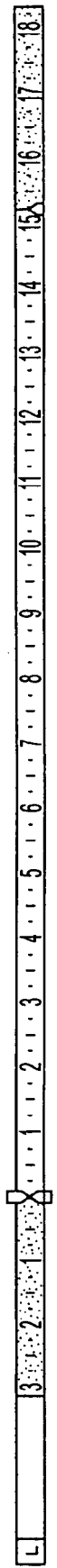
FIG. 2 is another illustration of a conventional slider.
Figure 3:
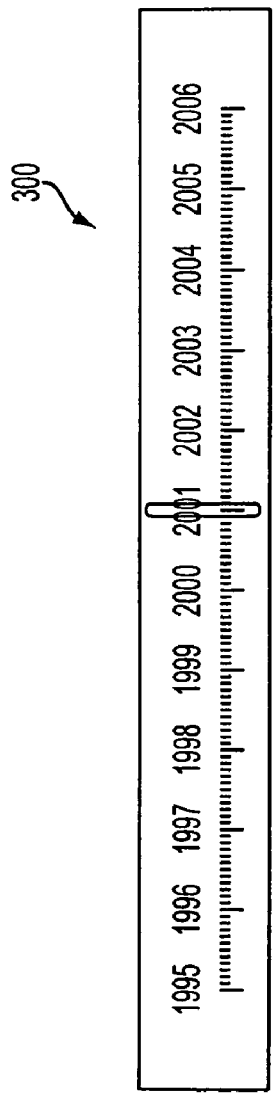
FIG. 3 is an illustration of an example of a conventional slider.
Figure 4:
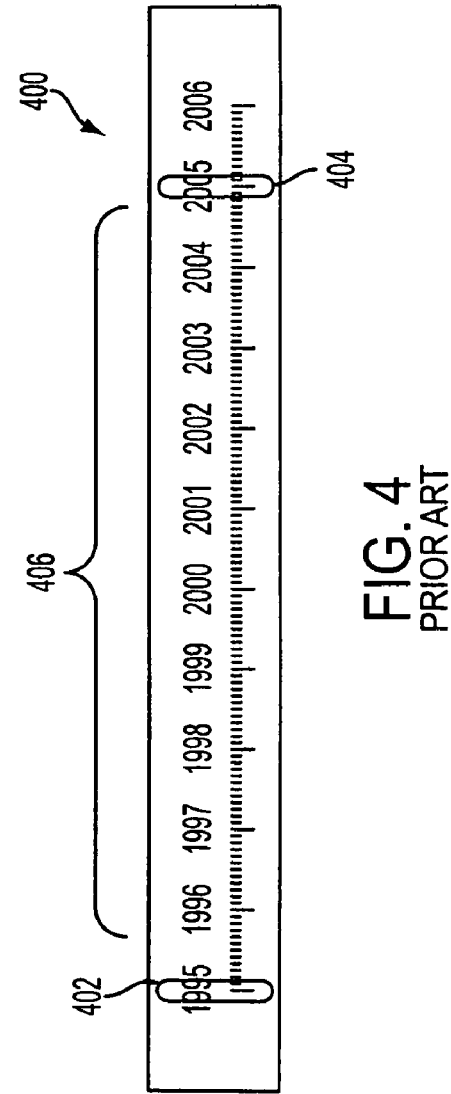
FIG. 4 is another illustration of the example of the conventional slider.
Figure 5:
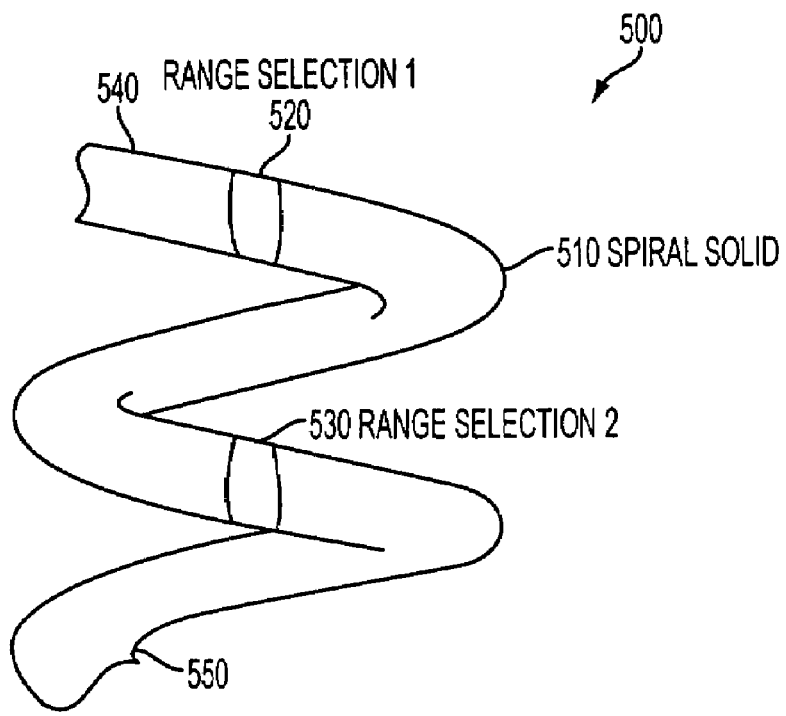
FIG. 5 is an exemplary embodiment of the invention.
Figure 6:
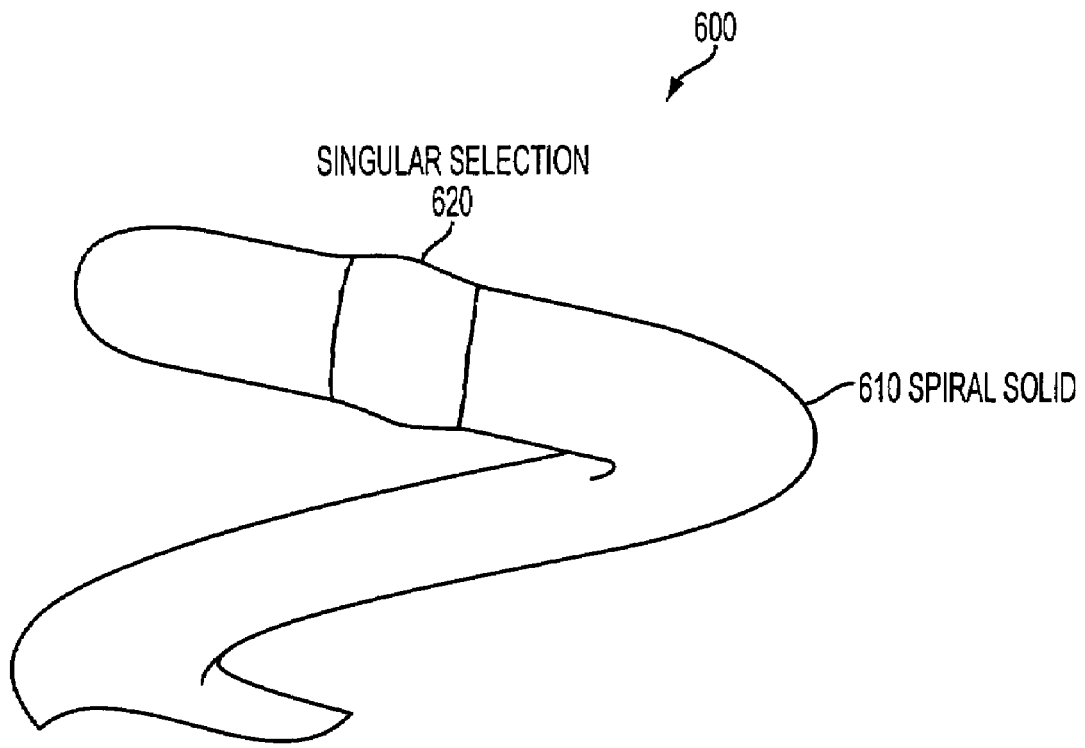
FIG. 6 is another illustration of the exemplary embodiment of the invention.

FIGS. 5 and 6 illustrate a first embodiment comprising a spiral solid display shape 500. The spiral solid display shape 500, although described as a solid shape, may also be a transparent shape offering visual details of two sides of the shape. Shape 500, as described in more detail below, enables a user to view and/or analyze an entire domain of values so that the user can easily select, using a reduced part of the overall user interface, a specific range of values (an extended domain of values), while maintaining sufficient detail of the remaining scale to facilitate further selection of smaller ranges or a singular value. In particular, FIG. 5 is an illustration of a simple spiral slider 500, comprised as a spiral solid 510, showing two selected value ranges 520, 530 highlighted within the extended full domain of values 540-550 of spiral solid 510.

Figure 7:
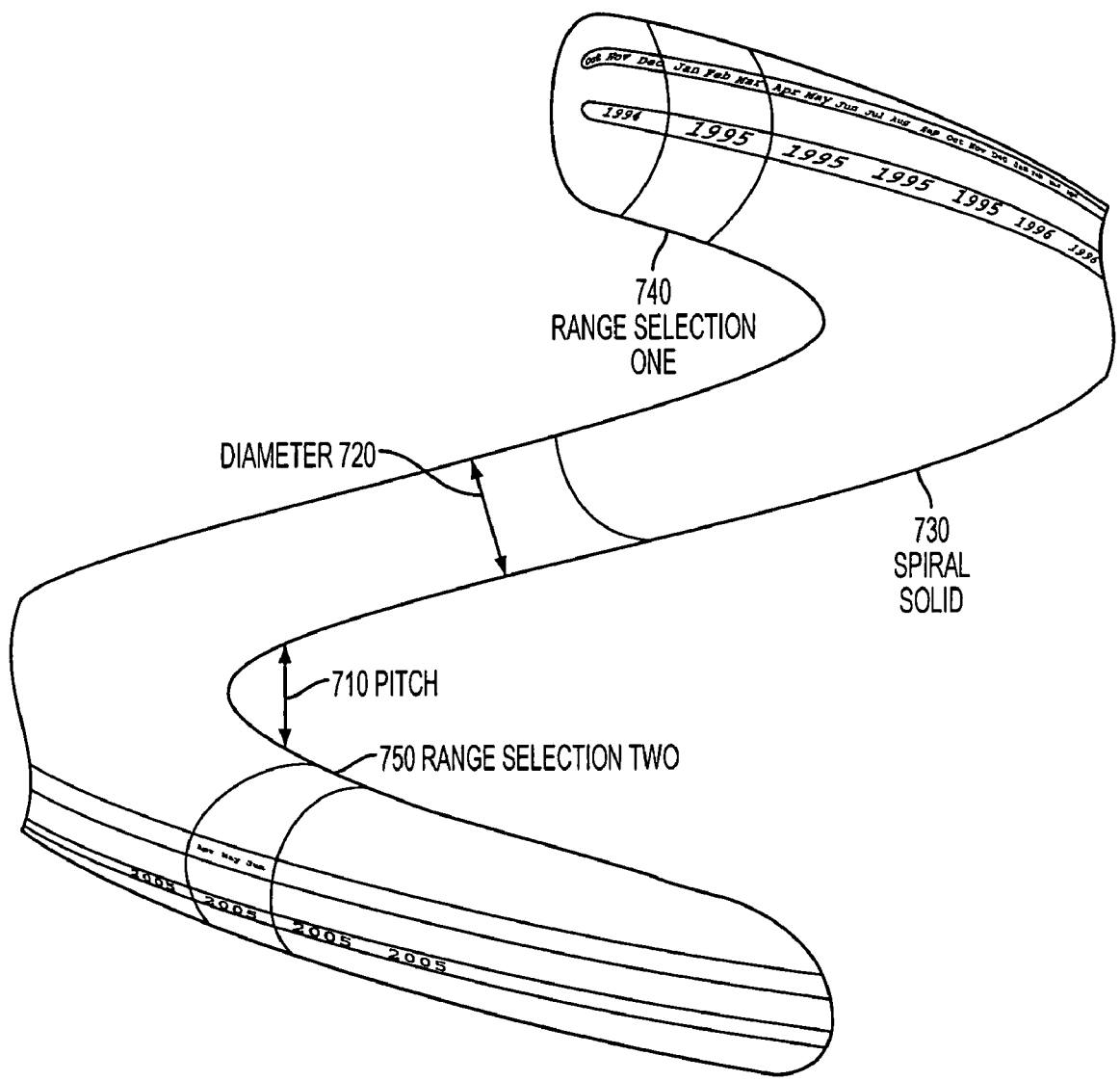
FIG. 7 is an illustration of another embodiment of the invention.

FIG. 6, in accordance with another embodiment of the invention, is an illustration of simple spiral slider 600. However, only one singular range 620 is selected from an extended domain of values. It should be appreciated that a user can select a single range for viewing and analysis, or alternatively select multiple ranges for further view and analysis. FIG. 5 illustrates an example of the invention where a user has selected multiple ranges for view and analysis and FIG. 6 illustrates an example of the invention where a user has selected only one singular range for view and analysis. FIG. 7, as described below, illustrates an example of the invention transposing a further range selected from within a selected range.

The user refers to the displayable shape via an input device (not shown), such as a mouse, light pen, keyboard, touch-screen, etc. Representative operation may include displaying an image on the screen in addition to the displayable shape such as a table or graph, compiling a spreadsheet, collecting text, lining up icons, or any other desired application and displaying them on the face of the spiral solid.

When the user selects (i.e., refers to) a range of values via the input device, those values are obtained from the system's data source such as, for example, accessing a memory, or activating a communications channel, or downloading data from the internet or other WAN or LAN. When multiple ranges or a single value are selected, a collar is formed around the displayable shape to highlight the selected range or value. The pitch and the diameter of the displayable shape can be changed so that the currently referenced information is oriented towards the front (i.e., the displayed side) of the shape. A user can select another range of values from within the selected range for view or analysis. The selected ranges and the overall domain of values can be displayed differently using graphical effects such as: distinguishing them by color differentiation, having the non-selected ranges fade away, etc.

Figure 8:
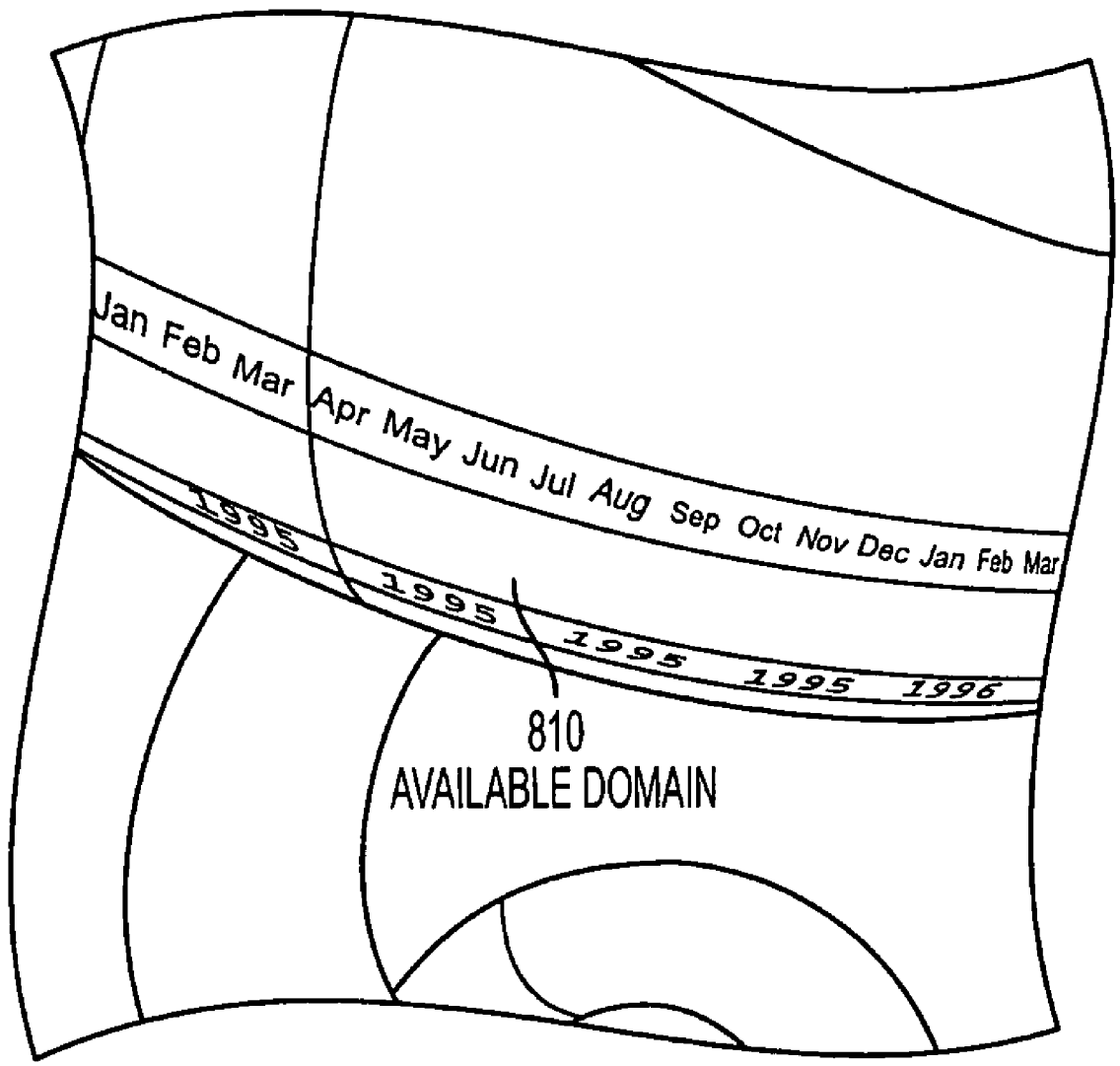
FIG. 8 is another illustration of an embodiment of the invention.

FIG. 7 illustrates alteration of the shape of the displayable spiral to improve visual recognition of data. In FIG. 7, the pitch 710 and the diameter 720 of the spiral solid 730 have been adjusted in such a way that both selection range 740 and selection range 750 are both equally visible to the viewer, but are still spatially accurate in the context of a ten-year period. Once a particular selection range 740 has been selected, the selected range 740 is rotated closer to the viewer, as shown in FIG. 8. It should be appreciated, for example, that the invention can also transpose a range within a range on the displayable shape, as shown in FIG. 7.

Figure 8A:
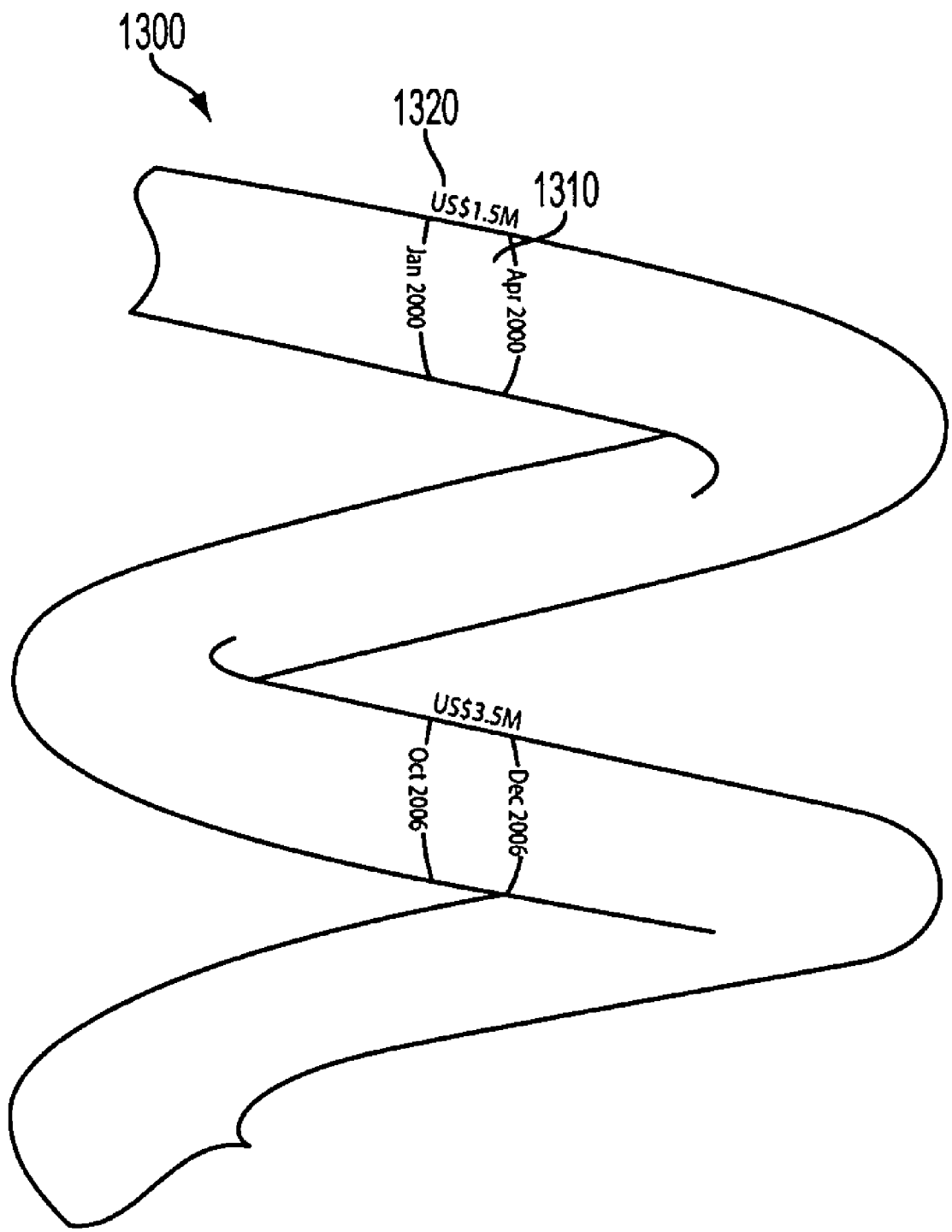
FIG. 8A is another illustration of an embodiment of the invention.
Figure 8B:
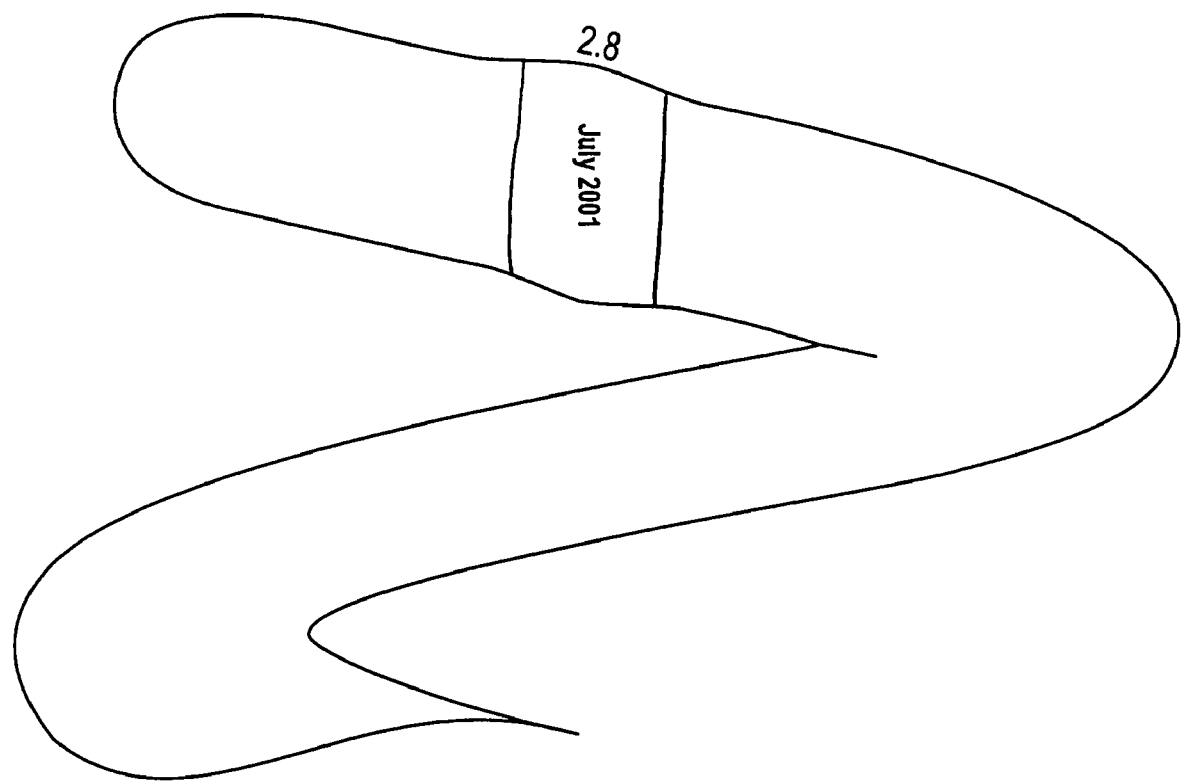
FIG. 8B is another illustration of an embodiment of the invention.

The display in FIG. 8 is constructed as follows. When the user selects the particular range, the user is given focused visual access to the selected range by zooming-in on that portion of the displayable shape reflecting information associated with the selected range. By virtue of the focusing function more detailed information associated with the selected range can also be revealed, as shown in FIGS. 8A and 8B. In the illustrated example 740, the displayable shape now representatively contains more detailed information such as the specific information associated with the selected date (not shown). The shape, size and orientation of the displayable shape and the numerous methods in which it displays information is application dependent and can reflect any schema desired by the user.

Figure 9:
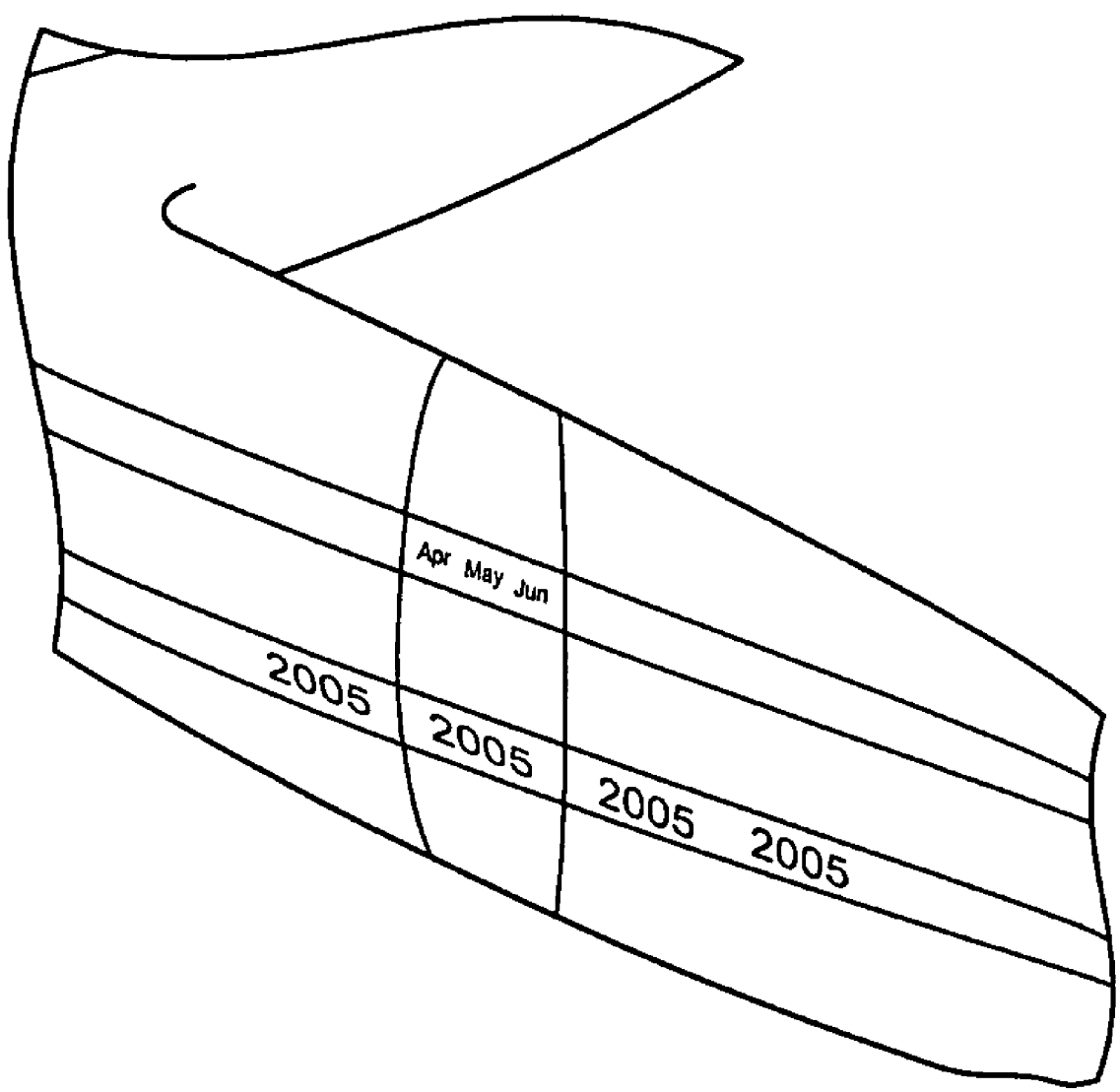
FIG. 9 is another illustration of an embodiment of the invention.

FIG. 9 illustrates a similar view of selected range 750, which was not visible in FIG. 8. The FIG. 9 view can be attained by having a user move a screen cursor through their mouse, light pen, finger, arrow key, etc. along the displayable shape or switching views by user interaction. To adjust the selected range, the user can change the size of the collar 910 (represented by the arrow) to adjust the target selected range, to either contain more or less of the available domain of values, or slide the collar along the displayable shape to encompass a new range of values.

Figure 10:
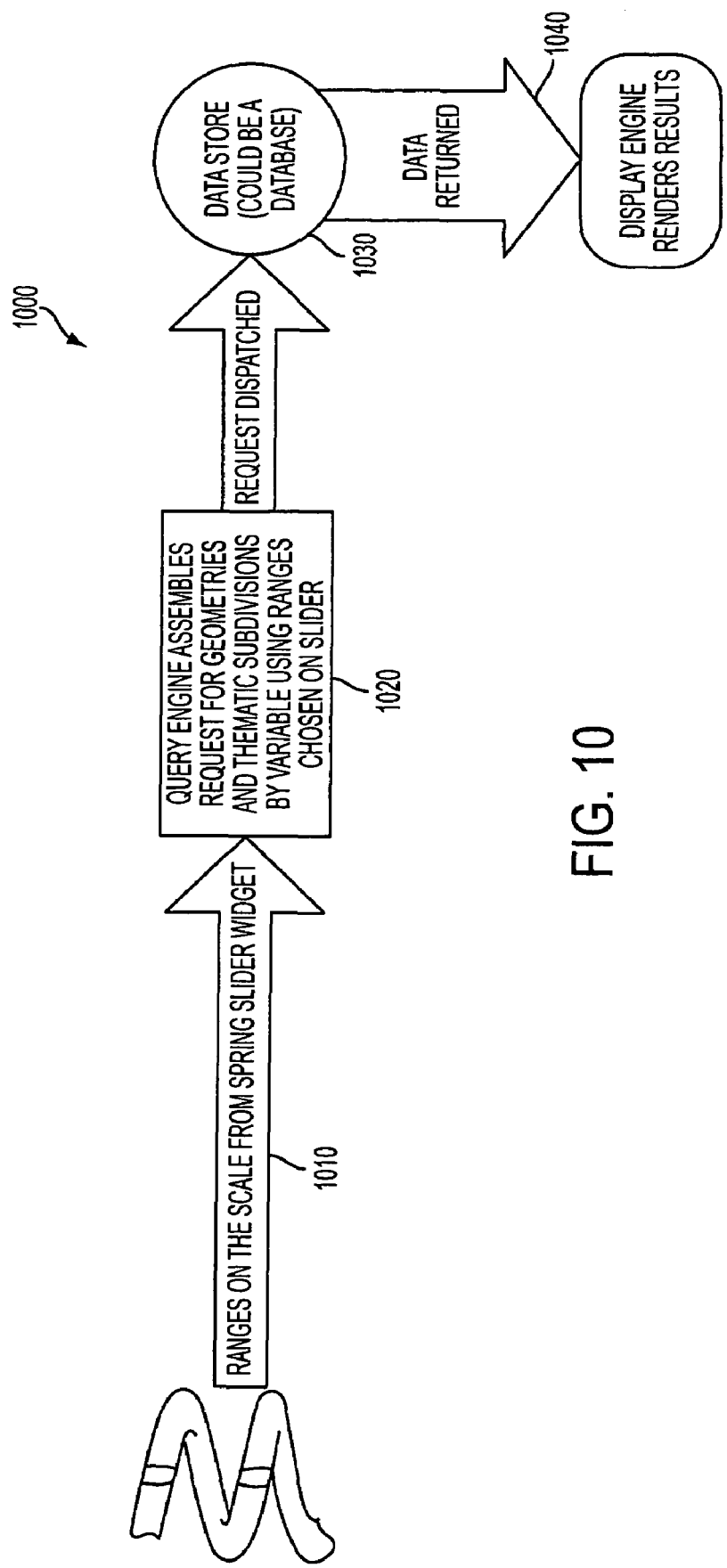
FIG. 10 is a flow diagram illustrating the process of the exemplary embodiment of the invention.

FIG. 10 illustrates the steps used for selecting ranges from an extended domain of values and processing the selected ranges through a suitable computer to create the displayable shape on a suitable display device. The extended domain of values can be transposed onto the displayable shape and displayed to the user, or can be displayed to the user after the ranges have been selected. The user can then pick the entire collar representing an instance of a range, the leading or trailing edge of the collar, or a region on the scale to create a new range. Additionally, the collar may be dragged along the slider to a new position. The leading or trailing edge of the collar may be dragged in or out to lengthen or shorten the range. In addition, an entire new range may be created by dragging edges on the displayable shape. When the user releases the input "drag" in any of the above instances and has thereby selected a given range, there is an implied event 1000. Event 1000 comprises steps 1010, 1020, 1030 and 1040 which are described below.

In step 1010, the user selects a range or ranges to be displayed. The selected values are then forwarded to a processor (i.e., query engine). It should be appreciated that although the selected range has been described as being selected by a user, the selected range can be programmed, predetermined, or, for example, calculated automatically by a processor or by any other method or technique. In step 1020, based on the forwarded selected range, the query engine assembles a request for geometries and thematic subdivisions using a variable representing the ranges chosen on the displayable shape and converts the altered selected range into selection parameters.

In step 1030, the converted selection parameters are dispatched to a data source (for example a database) and the requested data related to the selected range is generated. In step 1040, the generated data is returned to the display engine, which in turn renders the result to the user.

FIG. 8a illustrates event 1000, as described above, using another sales example. A user seeks to examine sales figures as they may relate to weather patterns and unreasonable weather is forecasted for a desired period in late 2006. The user seeks to determine and project the effects of unreasonable weather on its sales figures. Referring to FIG. 8a, the user can select a given range 1310 in a previous year (e.g., 2000) that appears to be similar to the projected weather profile of the desired period of late 2006. In response to selecting the given range, the user is presented with a dialogue 1300. A data query is formed based on the values (e.g., dates) in the selected range 1310 and generates corresponding sales FIGS. 1320 for the given period. The generated sales figures are then displayed to the user. In addition, the user can perform a similar operation related to the projected sales during the same given period excluding the effects of unreasonable weather. Given these sets of data, which are displayed on the displayable shape, the user has sufficient information to predict, examine, analyze and view its sales figures for the desired forecasted period in a condensed and manageable format.

It should be appreciated that there are no specific hardware requirements to use the spiral slider. Moreover, there are no special requirements for the type of computer or processor needed. The disclosed spiral solid user interface can be implemented on any hardware and/or computer known in the art.

It will also be appreciated that the displayable shape in the previous examples does not have to be a spiral solid. Without detracting from the invention, the displayable shape may appear in various shapes and in any arrangement: cubes, pentagons, tubes, arcs, etc. Nor is there a reason to limit the displayable shape to a flat sided spiral. Indeed, it could be most useful for comparative analysis for the spiral to be circular in cross-section so that a user may spin the spiral and see similarities in graphs or maps.

Figure 11:
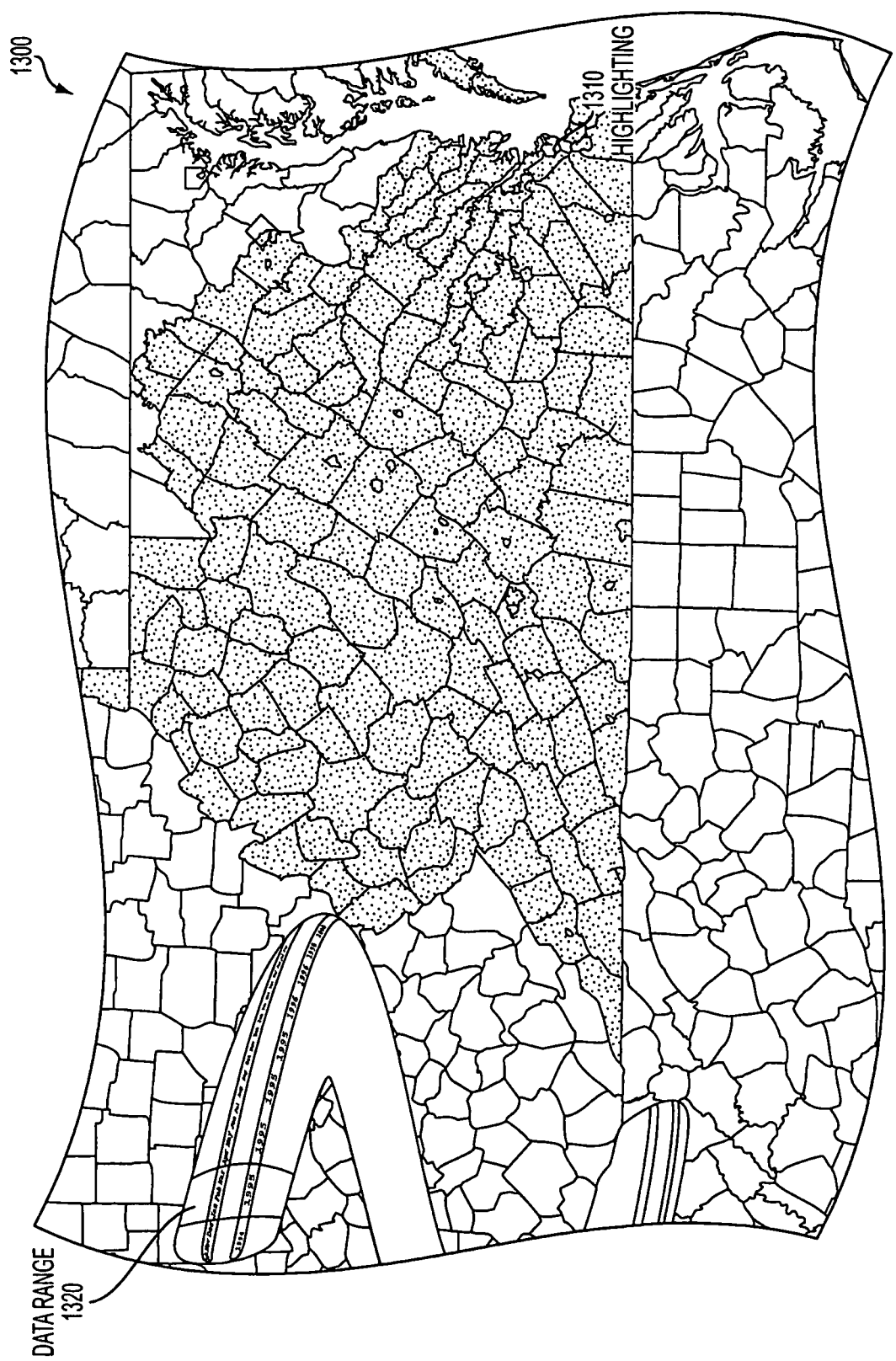
FIG. 11 is an illustration of another embodiment of the invention.

The displayable shape is also a type of legend. FIG. 11 illustrates a map 1210 being provided with live data revealing, via the displayable shape 1220, a progression of changing range values so long as the data belongs to the variable 1230 that is scaled along the displayable shape. Additionally, if the ranges of the displayable shape are moveable, then the displayable shape has the capability to provide the user with a more powerful interactive method of changing the view even as the data providing the view changes.

Figure 12:
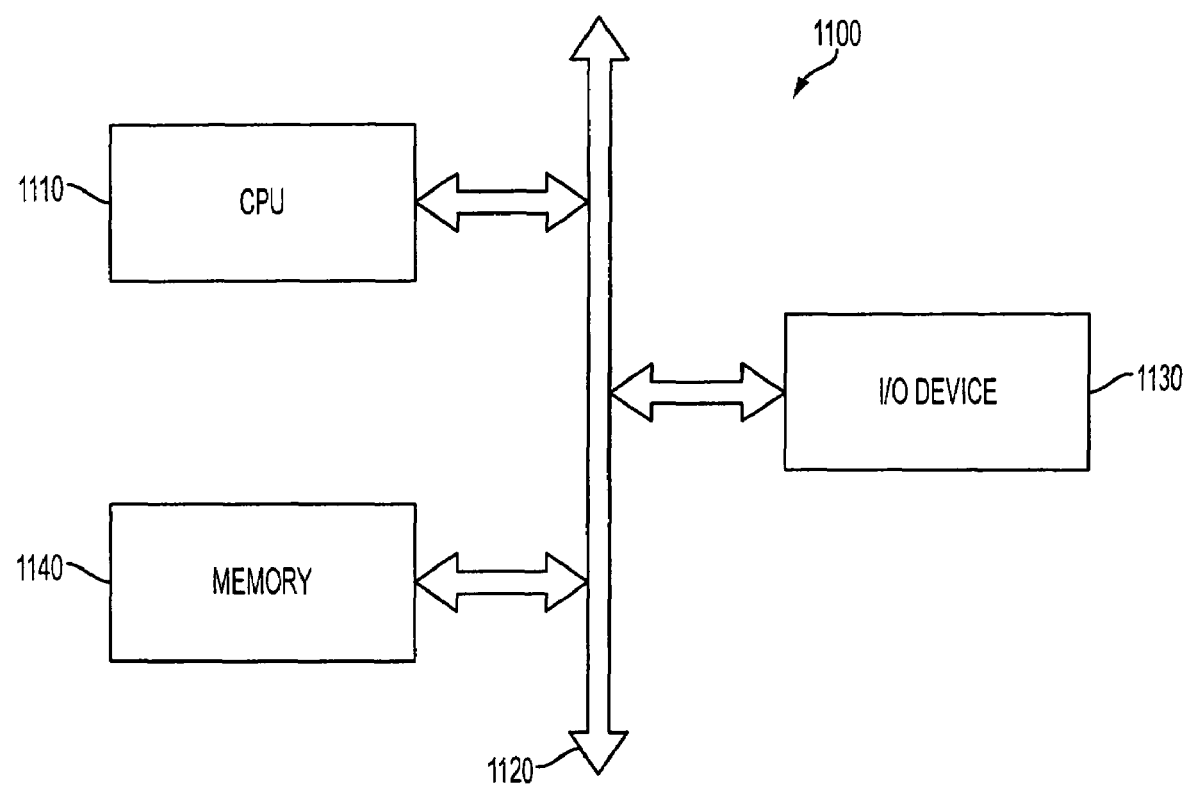
FIG. 12 is a processor system including the invention.

FIG. 12 shows system 1100, a processor system modified to include the system for allowing the selection of ranges from an extended domain of values and transforming the selections onto a displayable shape viewable by the user of the present invention. Examples of processor based systems, which may employ the system for allowing the selection of ranges from an extended domain of values and transforming the selections onto a displayable shape viewable by the user, include, without limitation, computer systems, machine vision systems, vehicle navigation systems, video telephones, surveillance systems, and others.

System 1100 includes a central processing unit (CPU) 1110 that communicates with various other devices over a bus 1120. Some of the devices connected to the bus 1120 provide communication into and out of the system 1100, illustratively including an input/output (I/O) device 1130 and system for allowing the selection of ranges from an extended domain of values and transforming the selections onto a displayable shape viewable by the user. Other devices connected to the bus 1120 provide memory, illustratively including a CPU 1110 incorporating the system for allowing the selection of ranges from an extended domain of values and transforming the selections onto a displayable shape viewable by the user. While one input/output device 1130 is shown, there may be multiple I/O devices such as a CD-ROM, hard drive, floppy disk, display, and keyboard as well as others. The system for allowing the selection of ranges from an extended domain of values and transforming the selections onto a displayable shape viewable by the user may also be combined with a processor, such as memory, digital signal processor, or microprocessor, in a single integrated circuit.

Additionally, the invention may be a software program stored on a computer readable storage medium (e.g., ROM) and executed by the processor. The stored information can be stored on a floppy disk, CD-ROM, ROM, RAM, HDD or any other suitable medium.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

Although the invention has been described in relation to a number of examples, in no way do those examples limit the invention. The invention can be applied to any system, industry or field that deals with user interfaces. The invention can be applied to any analysis system relating to scales of values, ranges and selection of ranges to form displayed data. It should also be appreciated that the manner in which the data and/or selection of ranges is obtained, or the type of equipment used to obtain the data and/or selection of ranges is also not limited to the above described examples.

The invention claimed is:

1. A system for selecting and displaying data comprising:
    means for selecting from an extended domain of values a selected range;
    means for transposing the selected range onto a displayable shape;
    wherein the means for transposing the selected range transposes the selected range onto a spiral solid; and wherein means for selecting the ranges comprises a collar for moving along the spiral solid to select a range of values.

2. The system of claim 1, wherein a selected range is chosen by sliding the collar between two previously formed rings marking existing selected ranges along the spiral solid.

3. The system of claim 1, wherein the display-able shape allows the user to see the entire domain from which the user is to choose in a reduced space in the overall user interface and sufficiently displays the details of the scale such that the user can select short ranges or singular values.

4. The system of claim 1, further comprising:
means for altering a pitch of the displayable shape; and
means for altering a diameter of the display-able shape according to information being displayed on the display-able shape such that a user can see all of the selected ranges towards a front of the display-able shape.

5. A computer implemented method of setting a parameter value in an apparatus having a display, the parameter value controlling a display functionality of the apparatus, the method comprising the steps of:
displaying on the display a three dimensional spiral object;
superimposing within the display and on the spiral object 1) a parameter scale having a plurality of positions along the parameter scale associated with a plurality of parameter values and 2) a collar movable along the spiral object and the parameter scale;
moving the collar along the spiral object and the parameter scale to a specific one of the plurality of positions within the parameter scale;
determining the one of the plurality of parameters based on the specific one of the plurality of positions; and
setting the apparatus to the one of the plurality of parameters, thereby altering the display functionality of the apparatus.

6. The method of claim 5, wherein the step of moving the collar along the spiral object and the parameter scale further comprises sliding the collar between two previously formed rings marking existing selected ranges along the spiral object.

7. The method of claim 5, wherein the spiral object allows the user to view an entire domain of the parameter scale in a reduced space in an overall user interface and sufficiently displays details of the scale such that a user can select short ranges or singular values.

8. The method of claim 5, further comprising the steps of:
altering a pitch of the spiral object; and altering a diameter of the spiral object according to information being displayed on the spiral object such that a user can view all ranges towards a front of the spiral object.

9. The method of claim 5, wherein the spiral object can be rotated such that selected ranges can be accessed by a user.

* * * * *